United States Patent
Fillion

(10) Patent No.: US 8,163,339 B2
(45) Date of Patent: Apr. 24, 2012

(54) EDGE DENSIFICATION FOR FILM BOILING PROCESS

(75) Inventor: Arnaud Fillion, Independence, KY (US)

(73) Assignee: Messier-Bugatti-Dowty, Velizy-Villacoublay (FR)

(*) Notice: Subject to any disclaimer, the term of this patent is extended or adjusted under 35 U.S.C. 154(b) by 387 days.

(21) Appl. No.: 12/210,228

(22) Filed: Sep. 15, 2008

(65) Prior Publication Data

US 2009/0087588 A1  Apr. 2, 2009

Related U.S. Application Data

(60) Provisional application No. 60/972,905, filed on Sep. 17, 2007.

(51) Int. Cl.
| C23C 16/00 | (2006.01) |
| B05D 1/18 | (2006.01) |
| C23C 8/00 | (2006.01) |
| C23C 14/26 | (2006.01) |
| H05B 6/02 | (2006.01) |
| H05B 6/24 | (2006.01) |

(52) U.S. Cl. ............. 427/248.1; 427/255.12; 427/430.1; 427/585; 427/587; 427/591

(58) Field of Classification Search ............... 427/248.1, 427/255.12, 430.1, 585, 587, 591
See application file for complete search history.

(56) References Cited

U.S. PATENT DOCUMENTS

| 3,953,566 | A |   | 4/1976 | Gore |  |
| 4,472,454 | A |   | 9/1984 | Houdayer et al. |  |
| 4,553,641 | A | * | 11/1985 | Scott et al. | 188/24.22 |
| 5,348,774 | A |   | 9/1994 | Golecki |  |
| 5,389,152 | A | * | 2/1995 | Thurston et al. | 118/429 |
| 5,397,595 | A |   | 3/1995 | Carroll et al. |  |
| 5,547,717 | A |   | 8/1996 | Scaringella et al. |  |
| 5,733,611 | A |   | 3/1998 | Thurston et al. |  |
| 5,981,002 | A |   | 11/1999 | Connors |  |
| 6,726,962 | B1 |  | 4/2004 | Loszewski |  |
| 6,858,302 | B2 |  | 2/2005 | Loszewski |  |
| 6,994,886 | B2 |  | 2/2006 | David et al. |  |
| 7,168,534 | B2 |  | 7/2007 | Loszewski |  |
| 2004/0022956 | A1 | | 2/2004 | Patrick |  |
| 2005/0115791 | A1 | | 6/2005 | Loszewski |  |
| 2007/0184204 | A1 | * | 8/2007 | Balagopal et al. | 427/419.2 |

FOREIGN PATENT DOCUMENTS

| WO | WO 2008-017676 A2 | 2/2008 |
| WO | WO 2008-017677 A2 | 2/2008 |
| WO | WO 2008-017678 A2 | 2/2008 |

* cited by examiner

Primary Examiner — Kelly M Gambetta
(74) Attorney, Agent, or Firm — Pillsbury Winthrop Shaw Pittman, LLP

(57) ABSTRACT

A method and apparatus are disclosed for improving densification of porous substrate using a film boiling process. In particular, the disclosed method and apparatus permit more complete densification of a substrate (i.e., densification closer to the surface of the substrate) by providing a sort of barrier that reduces cooling of the surface of the substrate being densified caused by contact with the relatively cool boiling liquid precursor of the densifying material, such as carbon. In particular, contact between the substrate and the liquid precursor is reduced using one or both of physical barriers (such as a mesh material) or structures that promote the formation of an insulating gaseous layer between the substrate and the liquid precursor (such as a plate closely spaced apart from the surface of the porous substrate).

20 Claims, 6 Drawing Sheets

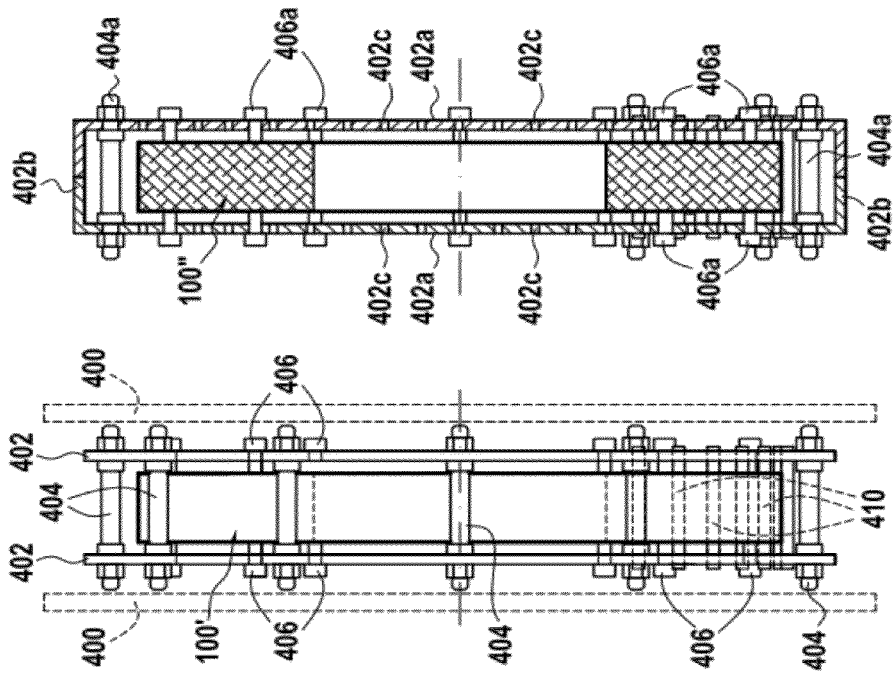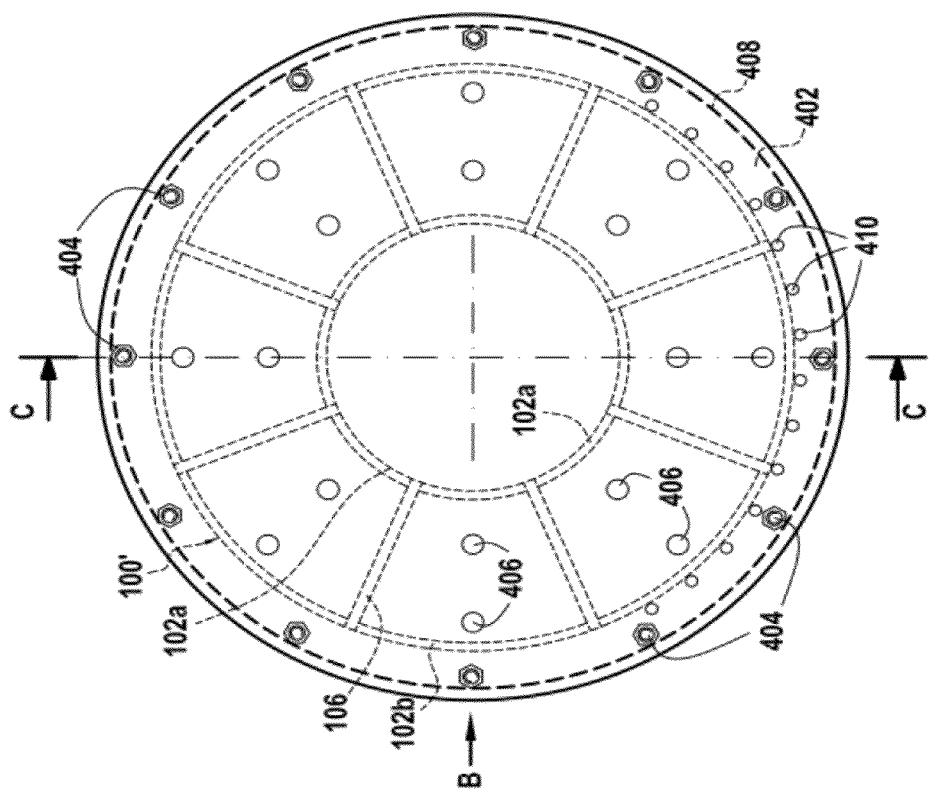

EDGE DENSIFICATION FOR FILM BOILING PROCESS

PRIORITY BENEFIT

The present application claims priority benefit of U.S. provisional application No. 60/972,905, filed on Sep. 17, 2007, the entire content of which is incorporated herein by reference in all venues and jurisdictions where incorporation by reference is permitted.

FIELD OF THE INVENTION

The present invention relates to densifying porous articles.

BACKGROUND OF THE INVENTION

In the field of friction materials, it is generally known to use substrates made from porous materials to manufacture friction members, such as friction brake disks. The manufacture of such friction members generally begins with the construction of a porous preform, such as an annular preform.

The annular preforms can be constructed using several different known methods. For example, carbon fiber fabric plies can be needled together and annular preforms can be cut from the stacked material. The plies may be made, for example, from airlaid fibers or woven fibers. Also, near net shape preforms can be formed, for example, by braiding the carbon fiber into a desired shape. Certain carbon fiber fabrics are known having a weave that facilitates laying the fabric in a spiral form. In this context, "near-net" refers to forming structures having a form close to a desired shape of the final article, such as an annular brake disk.

Oxidized polyacrylonitride ("PAN") fibers or pitch-based fibers are common examples of starting fibers used in this type of application. Subsequently, these fibers may be carbonized in a high temperature treatment step. In another conventional approach, the starting fibers are formed using a resin or pitch, and the resultant mass is later cured with a reactive gas, such as nitrogen gas. The thusly cured mass is then carbonized to obtain a semi-rigid preform.

In any event, it is desirable to further density the resulting porous preform (especially with a carbonaceous material) so as to obtain desired friction and mechanical properties.

Chemical vapor infiltration ("CVI") is a conventional densification technique for obtaining carbon/carbon (sometimes referred to in the art as "C/C") composite materials. CVI typically uses a hydrocarbon-containing gas to infiltrate a porous preform. The CVI gas is then cracked under high temperatures so as to leave a carbon coating on the fiber structure of the preform, thereby increasing the density of the article.

CVI using a gaseous precursor typically requires several hundred hours of processing in order to obtain a carbon/carbon structure having desired density characteristics and mechanical properties. By way of example, a typical CVI process includes a first gas infiltration cycle performed, for example, over approximately 300-500 hours or more.

However, conventional CVI frequently causes rapid blockage of the surface porosity of the preform before interior portions of the preform are adequately densified. In order to "reopen" the surface porosity (to allow the gaseous precursor to continue to reach interior parts of the article), an intermediate machining step becomes necessary. In general, this intermediate machining (using a known method, such as milling) removes surface layers of the preform having carbon-blocked pores to expose open pores of the preform, so that the hydrocarbon gas can again infiltrate the preform structure. Taking into account that several hundred preforms are densified in a typical densification, the intermediate machining step can add as much as 48 hours to the overall CVI densification process.

Once the intermediate machining of the partially densified articles is completed, a second CVI process is performed to make use of the reopened surface porosity of the preforms, which can last, for example, another 300-500 hours or more. This generally completes the densification process.

Another approach to densifying porous preforms uses a liquid instead of gaseous hydrocarbon precursor. This method of densification is sometimes referred to in the art as "film boiling" or "rapid densification."

The use of liquid precursors for densification is discussed in, for example, U.S. Pat. Nos. 4,472,454, 5,389,152, 5,397,595, 5,733,611, 5,547,717, 5,981,002, and 6,726,962. Each and every one of these documents is incorporated herein by reference in its entirety in all venues and jurisdictions where incorporation by reference is permitted.

Film boiling densification generally involves immersing a porous preform in a liquid, particularly a liquid hydrocarbon, so that the liquid substantially completely infiltrates the pores and interstices of the preform. Thereafter, the immersed preform is inductively heated to a temperature above the decomposition temperature of liquid hydrocarbon (typically 1000° C. or more). More particularly, the liquid hydrocarbon adjacent to the inductively heated preform structure dissociates into various gas phase species within the preform porosity. Further thermal decomposition of the gas phase species results in the formation of pyrolitic carbon on interior surfaces in the open regions of the porous material.

The liquid hydrocarbon may be cyclopentane, cyclohexane, 1-hexene, gasoline, toluene, methylcyclohexane, n-hexane, kerosene, hydrodesulfurized kerosene, benzene, or combinations thereof. In addition, the liquid precursor may contain an organosilane, such as methyltrichlorosilane, dimethyldichlorosilane, methydichlorosilane, or tris-n-methyl amino silane. In some cases, the liquid precursor may be a mixture of an organosilane and a hydrocarbon.

The liquid precursor may be formulated in a known way to obtain combination decomposition products. For example, the decomposition product may comprise silicon carbide and silicon nitride, or carbon/silicon carbide or carbon/silicon nitride.

Because of the boiling liquid surrounding the preform, a strong thermal gradient develops between the inner (i.e., core) and the outer (i.e., peripheral) parts of the disks. Densification generally starts at core regions because the temperature there is relatively higher than at more outward surface parts. The porous article can therefore be substantially completely densified in only one densification process step, much faster than when using the regular isobar CVI ("I-CVI") process (where densification preferably occurs at surfaces of the articles), which tends to seal the porosity of the article and prevent further gas infiltration. The kinetic of liquid precursor densification may be on the order of 100 times faster than using a gas infiltration step.

However, because the preform is immersed in a liquid, a high power level is necessary to keep the maximum temperature above the cracking temperature of the liquid precursor. For example, in the case of densification using cyclohexane as a precursor, an interior temperature of the porous article during densification may be between about 900° C. and about 1200° C. although the surrounding liquid cyclohexane temperature is only about 80° C. to about 82° C. As a result, overall electric consumption is high compared to the standard l-CVI process.

Also, as the densification front moves toward the peripheral edges/surfaces of the porous preform, the power must be progressively increased in order to maintain a necessary temperature of the densification front. Thus, at the end of a densification cycle, the power level might be 5 or 10 times that of the initial power level. This increases the electric consumption and necessitates costly power supplies able to deliver the required heating.

Certain conventional solutions to these problems have been proposed in U.S. Pat. Nos. 6,994,886 and 5,981,002. For example, the preforms can be produced so as to be oversized, and densification is stopped when the densification front is still slightly (e.g., a few millimeters) away from the surface of porous article. This approach decreases the power needed to heat the core of the preform because the preform itself effectively acts as an insulator—the thicker the preform is, the better it serves to insulate its interior relative to the above-described thermal gradient. Also, the required final power to achieve the densification will be lower, depending on the thickness of sacrificial material (i.e., the depth of the undensified material at the surface of the preform). However, this approach necessary results in a certain level of material waste. In addition, when thicker preforms are used, infiltration as a whole becomes relatively more difficult. This can cause the core part of the preform to be insufficiently densified because the precursor has difficulty in reaching the interior of the preform.

Another approach relates to wrapping a preform with another material to create a physical boundary between the boiling liquid precursor and the preform itself. Depending on the nature of the layer, different results are expected. In U.S. Pat. No. 5,981,002, a layer of carbon felt is proposed to improve the edge densification of the disk. The carbon felt allows the densification front to move closer to the edge (i.e., surfaces) of the preform using less power. The carbon felt can withstand the high temperature of the densification front as it approaches the surface of the preform.

In certain situations, this approach cannot be used. For example, when the preform is inductively heated by electromagnetic coupling, the carbon felt itself may be inductively heated (like the preform) and become densified during the densification cycle. This would seal the porosity of the article, preventing the precursor from reaching interior parts of the preform and compromising the proper densification of the disk.

U.S. Pat. No. 6,994,886 discloses using one or more layers of a polytetrafluoroethylene (PTFE) textile (sometimes commercially known under the trademark Gore-Tex®). This document asserts that liquid entry into the preform is limited by PTFE so the required electrical power to density the material is significantly decreased and the densification rate increased. However, because of the low permeability of the PTFE textile (compared to the permeability of carbon felt, for example) the transfer of precursor to interior parts of the preform is hindered. Accordingly, when articles being densified are relatively thick, there is depletion of precursor at the core portions of the preform. This can result in an insufficiently densified core (sometimes referred to as a "hollow" core).

For example, if a 25 mm thick carbon brake disk preform is to be densified, the use of PTFE textile to insulate the preform necessitates a dramatic decrease in the densification kinetic (i.e., slower densification) in order to avoid a hollow core. Thus, the benefits of using PTFE as disclosed in U.S. Pat. No. 6,994,886 have to be balanced by an increase of the cycle time.

In view of the foregoing, an improved approach to the use of liquid precursors for densifying porous articles is desirable.

BRIEF DESCRIPTION OF THE INVENTION

In an aspect of the present invention, a polytetrafluoroethylene (sometimes referred to as "PFTE" or Teflon®) mesh porosity of between 30% and 60% is used to wrap the preform to be densified, instead of a carbon felt, as is known in the conventional art.

In another aspect of the present invention, a wall or other partition (partially perforated or solid) closely surrounds the preform to be densified. When the power is raised at the end of the densification cycle and the densification front approaches the peripheral or surfaces portions of the part, the liquid/gas boundary is held away from the preform surface because of the wall.

Another aspect of the present invention relates to combining CVD and film boiling such that most of the material is densified by film boiling, and then, before the preform is fully densified, the level of liquid precursor in the film boiling reactor is decreased so the preform is no longer immersed in the liquid precursor. The densification thereafter becomes a gaseous CVD process. Densification can be finished using vapor from the liquid precursor that remains in the reactor chamber. The required final power is greatly decreased and the edge densification is improved.

BRIEF DESCRIPTION OF THE DRAWINGS

The present invention will be even more clearly understood with reference to the drawings appended hereto, in which:

FIG. 4A is plan view of another aspect of the present invention;

FIG. 4B is a side elevational view corresponding to the subject matter of FIG. 4A;

FIG. 4C is a side cross sectional view representing a variant of the subject matter illustrated in FIG. 4B;

DETAILED DESCRIPTION OF THE INVENTION

Figure 1:
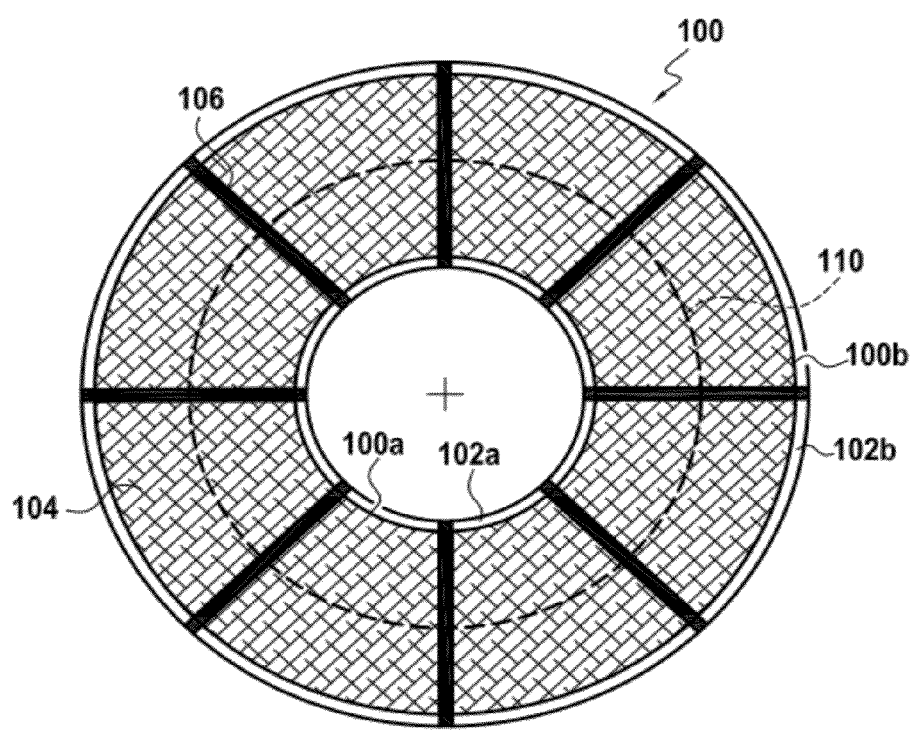
FIG. 1 is a plan view illustrating an object to be densified that is at least partly covered by an open porosity mesh material.

1. Mesh material having high open porosity

In a conventional film boiling densification process, improvement of densification at the edges (surface or peripheral) compared to the conventional art is a concern. To address this issue according to conventional approaches generally requires a high power level during a film boiling process.

For example, to density a 20" carbon brake disk (densification front moved substantially up to the surface of the brake disk) may require more than 70 W/cm² at the end of the cycle when the part is heated with direct coupling. One way to decrease this power consumption is to physically insulate the preform. However, insulating the preform very often affects homogeneity of the densification. In particular, wrapping a preform with insulation such as carbon felt or a PTFE textile as described in U.S. Pat. Nos. 6,994,886 and 5,981,002 can have a negative impact on the core densification.

As is generally known, the high thermal gradient maintained by the surrounding boiling liquid makes rapid densification possible. That is, the core of the preform is the hottest part so densification desirably starts in the middle or interior of the preform. This avoids the surface sealing problem which commonly occurs during a standard isothermal CVI process (which necessitates time-consuming intermediate machining steps to "reopen" the porosity of the material in order to permit the conventional gaseous precursor to infiltrate the interior of the preform structure).

However, this thermal gradient does not necessarily avoid under-densification of the preform core. Several parameters are involved, including, without limitation, the thermal properties of material of the preform, the porosity distribution in the material being densified, the permeability, and the maximum temperature. A fine balance has to be found between these parameters in order to get the best industrial compromise; a short densification cycle, low power consumption, homogeneous densification, and suitable preform architecture (this last one mostly dependent on the final intended use of the part).

For example, a way to improve the densification homogeneity is to decrease the process temperature, but at the same time this will problematically increase the cycle time. Another way to improve densification homogeneity is to modify the preform so that it is optimized for a short densification cycle time and high densification levels, but this does not necessarily lead to optimal characteristics for the final desired use of the article. In addition, modifying each preform individually can complicate production as each individual preform has to be modified in a certain manner.

In the case of carbon preform disks for aircraft brakes, the preform architecture is not usually optimized for film boiling according to the criteria emphasized above. Compared with an optimized preform, an "aircraft" preform generally requires a lower densification temperature to start the cycle (meaning longer cycle time), may possibly use more power, eventually giving a lower bulk density.

Adding an insulation layer such carbon felt or PTFE textile as is known is believed to cause a "flattening" of the thermal profile inside the preform and decrease the transfer of precursor into an interior of the preform. Both of these parameters are involved in the core densification. For a PTFE textile, the low permeability of the fabric prevents, or at least hinders, the liquid precursor from entering the preform, so the infiltration of the liquid precursor into interior parts of the preform is dramatically retarded. A severe starvation of the gas phase species subsequently occurs when the kinetic of deposition is kept in the usual range. In general, the conventional use of PTFE necessitates a lower temperature of densification in order to get the same homogeneity. As a result, the cycle time for densification increases.

When carbon felt is used in the conventionally described manner, the negative effect on precursor transfer is not as great as with as with the PTFE textile. However, when the power increases in order to make the densification front move forward, sometimes the carbon felt itself is inductively heated by the induction field. As a result, the carbon felt also becomes densified. As soon as densification starts inside the felt insulation, the porosity of the underlying preform begins to become closed off, so that some areas of the preform close to the felt remain under-densified when the cycle is finished.

Thus, a method is provided to improve the edge densification of a preform being densified by film boiling without compromising the core densification or increasing the cycle time. A mesh material having a significantly greater open porosity (for example, between about 30% and about 60%) than the conventionally used PFTE textile is used. The porosity of the mesh used according to this aspect of the present invention is thus so high that it does not disrupt or otherwise retard the infiltration of liquid precursor or affect the thermal profile at the beginning of densification, when the power is low. It is believed that at this point in the densification process, a mesh having such porosity has no effect on the densification compared to a situation without any insulation, so conditions remain optimal for core densification.

On the other hand, when the densification front approaches the surface, the open mesh according to this approach becomes a barrier between the preform and the turbulent liquid precursor. The densification front is protected and can move forward up to the surface with a lower power than in the conventional film boiling process.

The material of the open mesh preferably has some or all of the following characteristics: chemically stable in the boiling precursor; able to withstand the temperature when the densification front gets to the surface of the material being densified so the insulation remains intact; stiff enough to provide a substantially constant contact between the preform and the insulation material; and may be electrically insulative if the preform heating is done by electromagnetic direct coupling.

The example described hereafter is for the densification of a 20" aircraft brake disk by film boiling, in which the preform is heated by electromagnetic direct coupling. The preform is made from carbon fiber in a known manner, and the liquid pyrocarbon precursor is cyclohexane. Film boiling is performed generally according to any one or more of U.S. Pat. Nos. 4,472,454, 5,389,152, 5,397,595, 5,733,611, 5,547,717, 5,981,002 and 6,726,962, using parallel pancake inductive coils as described in those documents. Each of these documents is incorporated herein by reference in their entirety in all jurisdictions and venues where incorporation by reference is permitted.

An example of this aspect of the invention is illustrated in FIG. 1. FIG. 1 is a plan view of an annular preform 100 that is to be densified using a film boiling process. The annular preform 100 has radially inner and outer peripheral edges 100a, 100b (sometimes referred to herein as inner and outer diameters, respectively). A woven fiberglass material 102a, 102b is wrapped around the inner and outer peripheral edges 100a, 100b of the preform, respectively. The fiberglass material may be, for example, a woven fiberglass tape, 0.007" thick, commercially available from CST; or a Flexweave 1000 Tape, ⅛" thick, commercially from AVS Industries.

Two annular disks made of, for example, an open porosity PTFE mesh 104 (only one being shown in the plan view of FIG. 1) are set on the opposing wear faces (i.e., the axial faces) of the annular preform 100. The annular PTFE mesh disks 104 and the fiberglass tape portions 102a, 102b are held in relation to one another by, for example, a thread or yarn 106 wound several times between the inner and outer peripheral edges 100a, 100b of the annular preform 100. For example, AvSil Silica Yarn, commercially available from AVS Industries, may be used. The PTFE mesh disks 104 have, strictly by way of example, an open porosity of 50%. An example of an appropriate PTFE mesh material is ET8700, commercially available from InterNet, the mesh having openings each having a major dimension of 6 mm (0.236") and a minor dimension of 3 mm (0.118").

The brake disk is then densified according to the film boiling process as is known in, for example, any one or more of U.S. Pat. Nos. 4,472,454, 5,389,152, 5,397,595, 5,733, 611, 5,547,717, 5,981,002 and 6,726,962; and PCT patent application Nos. PCT/EP2007/058193, PCT/EP2007/058195, and/or PCT/EP2007/058197, each of which is incorporated by reference herein in entirety in all jurisdictions and venues permitting the practice of incorporation by reference.

In order to evaluate the effect of the mesh, the power curve is recorded and the resultant densified disk is scanned using x-ray tomography.

Figure 2:
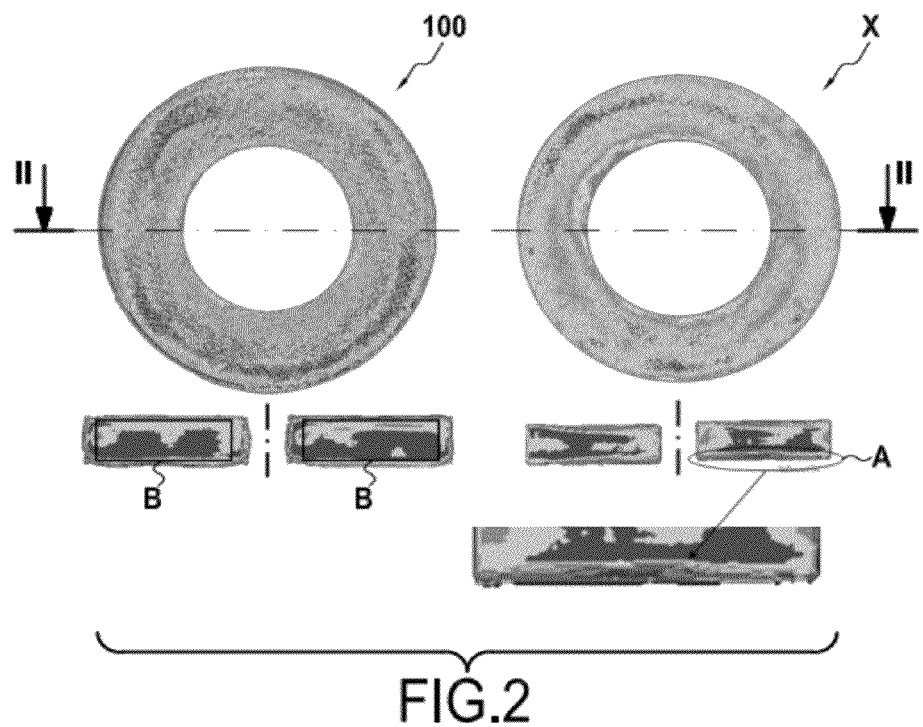
FIG. 2 illustrates plan and sectional views of an X-ray tomography scan of an object densified in a conventional manner and in a manner corresponding to the subject matter of FIG. 1.

FIG. 2 schematically illustrates results of x-ray tomography scans done after densification of preform disks with and without open porosity mesh insulation as described hereinabove. Plan views of each disk and corresponding cross-sectional views relative to line A-B are shown.

On the right of FIG. 2 is a picture of a preform disk X densified without any insulation on the wear faces and after a machining step. In addition, on the right side of FIG. 2, an enlarged cross-sectional view A of a part of the surface is illustrated. A final power level of 180 kW is used.

On the left side of FIG. 2 is a picture of a preform disk 100 densified using a PTFE mesh in accordance with the above-described aspect of the invention with reference to FIG. 1 (although without a customary machining step before the x-ray scan). In the cross-sectional view on the left side of FIG. 2, the black rectangles B schematically indicate an approximate cross-sectional profile of the disk after a conventional machining step so as to be comparable to the cross-sectional view on the right side of FIG. 2. A final power level of 120 kW is used with respect to disk 100.

FIG. 2 shows that the surface of the disk X densified without a mesh according to this approach remains largely underdensified (as represented by the relatively lighter gray regions) (density<1.3 over 5 mm from the surface). In comparison, the densification of the disk with the mesh is largely complete over the final machined dimensions (as illustrated by the area defined by the black rectangles B in the cross-sectional view. In addition, the maximum power used for the disk 100 with mesh was 120 kW whereas 180 kW was used for the other disk X (i.e., 50% more when the mesh is not used). Finally, the radial scans (i.e., plan views) show the midsections of both disks are properly densified and similar. The mesh as contemplated here did not appear to affect core densification unlike what is known from conventional use of insulating layers on the wear faces of a brake disk.

Once the densification cycle is completed, the open porosity mesh material 104 may be re-used several times in accordance with the wear and durability of the mesh material selected.

Initial study suggests that the median surface region of the preform generally indicated by broken circle 110 in FIG. 1 may become hotter than desirable when an open porosity mesh is used according to this approach. This may cause undesirable cracking of the liquid precursor outside of the preform at this region, before densification of the preform is completed. This heating may possibly be caused by the heating profile created during direct coupling. That is, because the axial thickness of the preform is relatively small compared to the radial extent of the preform, the direct coupling may be causing the "front" of the heated portion to reach the axial surfaces of the preform before the radial edges of the preform are heated.

For this reason, it may be of interest to provide an unprotected gap on the axial wear faces of the preform corresponding to the broken line circle 110 in FIG. 1. For example, instead of providing a single annular disk of open porosity mesh material on opposing faces of the preform, first and second independent mesh rings (not shown) having different diameters (thereby leaving a space therebetween) could be provided. This would permit densification to be slightly retarded at this part of the preform in order to let the densification front reach further in the radial direction.

2. Liquid/Gas boundary insulation

Another approach for improving densification is to insulate or otherwise separate the preform from the turbulent liquid precursor, especially at the end of the densification cycle. This allows the densification front to move forward closer to the surfaces of the article being densified compared with not using some form of barrier. A relatively stable or calm layer of precursor in gas form is established at the surface of the disk (or other article) being densified, at the end of the cycle when the densification front comes close to the surface, relative to the liquid precursor. This can be achieved by providing a wall or plate member adjacent to the part being densified at a distance of about 1 mm to about 5 mm from the surface of the disk. At the end of the densification cycle, the heat emitted by the part being densified becomes so significant that the liquid precursor is pushed away from the surface of the part, behind (i.e., on the other side of) the wall. At that point, only a layer of gas (composed of precursor vapor and gaseous by-products) surrounds the part. This layer of gas acts like an insulating layer, and significantly reduces cooling of the part surface (caused when the relatively cool liquid precursor contacts the part), so the densification front can move forward even closer to the surface.

This phenomenon (sometimes referred to in the art as "vapor lock," as discussed in, for example, U.S. Pat. No. 5,389,152) is usually considered detrimental to densification because it creates hot spots on the surface during the densification cycle. These hot spots have inconsistent densification tendencies, and can lead to obstruction of the open porosity of the preform and the formation of heterogeneous parts. However, carefully controlling the power during densification can avoid this sealing effect while still obtaining other manufacturing advantages.

While the power is still relatively low during the first stage of densification, the preform is still surrounded by the liquid precursor (assuming the gap between the preform and the wall is properly selected for a given process setup). There is therefore no difference in the thermal profile or in the transfer of precursor elements inside the part, whether or not a wall is provided. That is, core densification is not affected by the addition of the wall arrangement contemplated in this approach.

This method has similar benefits as using an insulating layer directly wrapped around the disk, such as the open porosity mesh material described hereinabove. For example, the maximum required power to completely density the part is generally decreased. Also, there is no negative effect on the densification of core regions of the part being densified, and there is relatively improved densification homogeneity at the surface of the article being densified. Finally, no special preparation of the part itself is required before the densification process—the same appropriately constructed densification apparatus can be used for a plurality of parts. This results in time and cost savings in efficiently running a densification process.

Several parameters are involved in this approach:

First, the material used to build the wall(s) must be able to chemically and thermally withstand the boiling precursor in the film boiling process. When the article being densified is heated by direct electromagnetic coupling, the material used must additionally be electrically non-conductive. G10 glass, PTFE, concrete, and ceramic materials are examples of suitable materials for this application.

Second, the physical separation between the surface of the preform and the wall must be kept constant. In particular, any direct contact between the wall and the preform surface should be avoided as much as possible. If contact occurs, the material used for densification may be deposited at the point of contact because the wall will be heated by the preform that is heated by electromagnetic coupling. In particular, a "bridge" of the densification material may be deposited or otherwise build up between the wall and the preform at the point of contact. This can damage or even destroy the wall of the temperature of the deposited densification material exceeds the heat resistance (i.e., temperature tolerance) of the wall material. The distance between the surface of the preform and the wall may be maintained using spacers such as pins or rods made from a ceramic and disposed between the preform and the wall.

Third, the wall may be solid, perforated with a constant number of holes or openings per unit surface area (i.e., a kind of mesh or screen), or it may perforated in only certain areas thereof.

Fourth, the preform being densified may be totally or partially surrounded by the wall. If the preform is to be surrounded in all directions by the wall as contemplated (i.e., about an outer radial periphery of the assembly) then openings or other apertures must be provided to permit some access of the liquid precursor to the preform.

The following illustrative examples relate to film boiling densification of preforms for 20" carbon brake disks, using different designs for the walls (material, shape distance, spacer). The particular diameter of the brake disk mentioned here is not part of the invention and the invention can be also applied Some of the objectives are to improve surface densification (i.e., on the wear faces) and/or decrease the final required power. When the densification front approaches the surface regions of the disk, the bulk density of the machined disk increases and the wear faces appear more homogeneously densified. X-ray tomography scans are performed to check on the core densification.

In the arrangements described below, power is optionally controlled through a common and constant frequency variation control. (See, for example, commonly owned PCT patent application No. PCT/EP2007/058197, which claims priority from U.S. Provisional Patent Application No. 60/821,596 filed on Aug. 7, 2006, which document is incorporated herein by reference in its entirety in all venues and jurisdictions permitting such practice.) By suitably controlling the applied power, the occurrence of the vapor lock phenomenon can be even better controlled.

The preforms are set vertically between two pancake induction coils, indicated generally by 400 in FIG. 4B. The walls are arranged as two generally parallel plates 402 arranged on either side of the preforms. See, for example, FIGS. 4A and 4B. The plates 402 are in this example solid (i.e., without perforations or without openings) and made of G10, PTFE, or a glass material. The opposing plates may be fixed in a generally parallel arrangement relative to each other by a plurality of fixtures disposed about a periphery of the plates 402. For example, a plurality of threaded plastic rods 404 may be used to engage the respective plates 402 relative to each other in the required generally parallel arrangement. As mentioned above, spacer elements 406 are provided. Spacer elements 406 may, for example, be screws or pins or rods or the like that protrude through the respective plates 402 to a predetermined extent in order to maintain the preform 100' at a desired distance from the respective plates 402. The spacer elements could be, for example, ceramic or glass, and are generally made of any material suitable for withstanding the expected environment with respect to temperatures and the presence of the heated liquid precursor. Contact between the walls and the preform surfaces is preferably to be avoided because of possible pyrolytic deposits building up at points of contact.

A mesh strip 408 (see FIG. 4A), possibly made from PTFE mesh, may be optionally provided about a periphery of the assembly in order to further separate the preform from the liquid precursor in accordance with the description herein.

Experiments suggest that there is a maximum distance between the wall and the preform surface of about 5 mm, beyond which no effect of the wall is observed up to a maximum power of 70 W/cm$^2$.

At 3 mm away from the preform surface, and at 70 W/cm$^2$, the cooling of the plates by the surrounding liquid/vapors is still sufficient to permit G10 to be used to make the walls (the G10 being the lowest temperature rated material tested).

Guide members (such as appropriately arranged elongate or rod members, not shown) may be provided on the surface of the wall members for use as guides when sliding the preform inside the tooling (i.e., between the plates 402).

Finally, a plurality of support rods 410 (made from a material that can tolerate the operational environment, such as ceramic) is provided in a generally annular pattern in order to further support the preform 100'. The plurality of support rods 410 may extend partly or substantially completely about a periphery of the preform 100'. In the former case, the support rods 410 may be fixedly mounted relative to plates 402. In the latter case, the support rods 410 may be mounted on a belt that is wrapped about a periphery of preform 100' and fixed separately to a stable mount in a conventional manner.

It is noted that FIG. 4A illustrates generally the optional use of fiberglass mesh tape or the like 102a, 102b, as in the previous example (see FIG. 1). The optional use of the previously described PTFE open porosity mesh to cover the wear faces of the preform is also possible in the example illustrated in FIG. 4A as was previously described, although such is not expressly shown in FIG. 4A. Finally, yarn 106 or the like is used as previously described.

Figure 3:
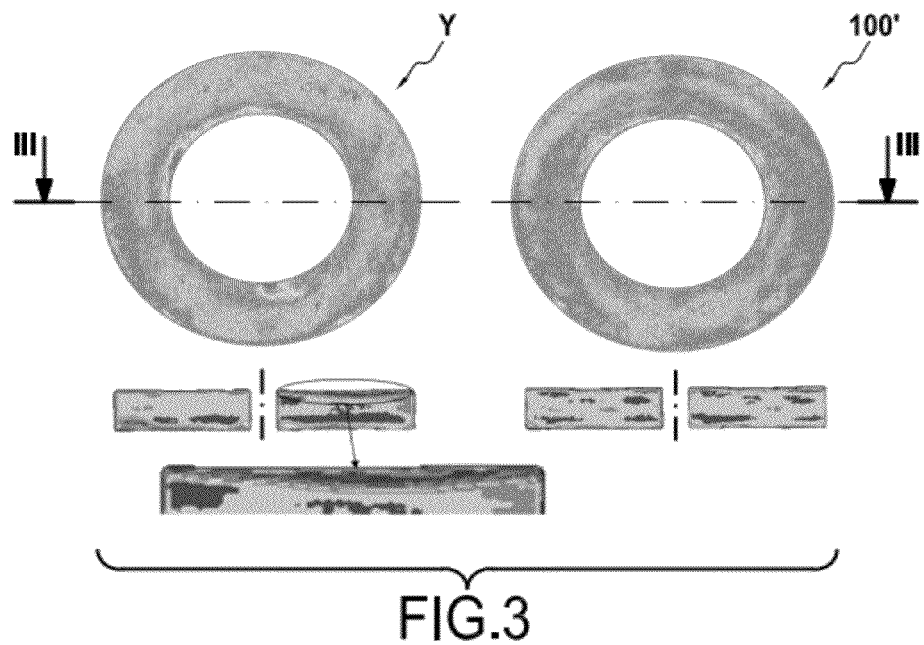
FIG. 3 illustrates plan and sectional view of an X-ray tomography scan of an object densified in a conventional manner and in a manner corresponding to the subject matter of FIGS. 4A, 4B, 5 and 6.

FIG. 3 illustrates some of the effects when using the approach illustrated with reference to FIGS. 4A-4C. FIG. 3 includes X-ray tomography scans of two disks: on the right side of the Figure, a disk 100' densified with G10 walls set 5 mm apart from the wear surfaces; and on the left side of the Figure a disk Y densified using film boiling without plates or wall members.

The left cross-sectional scan (i.e., the rectangle sections) shows an under-densified area on the wear surfaces of the disk Y. That is, the densification front stopped several millimeters away from the edge of the preform.

On the right side of FIG. 3, a similar preform 100' has been densified with the same conditions (identical power curve and precursor) but using a G10 plate assembly flanking the disk, as described here with reference to FIGS. 4A-4C. In comparison, this part is relatively completely densified (i.e., up to a point much closer to the wear surfaces). The radial scans (i.e., the plan views) show the midsections of both disks are properly densified and similar. Thus it can be appreciated that core densification is not altered by the walls.

FIG. 4C is a cross-sectional side view of a variant of above described assembly, in which particularly the periphery between plates 402a, 402a is closed off by a non-perforated wall 402b. In this case, in order to allow the liquid precursor to contact the preform 100", perforations or holes 402c are provided through the plates 402a. When the periphery of the assembly is closed in the manner suggested by FIG. 4C, the spacing between the walls 402a and the wear surfaces of preform 100" should be greater than the case where the periphery is open.

In an unillustrated example, the pancake induction coils may be embedded in concrete. In a particular example, the pancake induction coils may be embedded in concrete that forms the walls of a reaction chamber used for the disclosed densification process. In either case, the surface of the concrete in which the pancake induction coils are embedded can function like walls 402 (or 402a).

Figure 5:
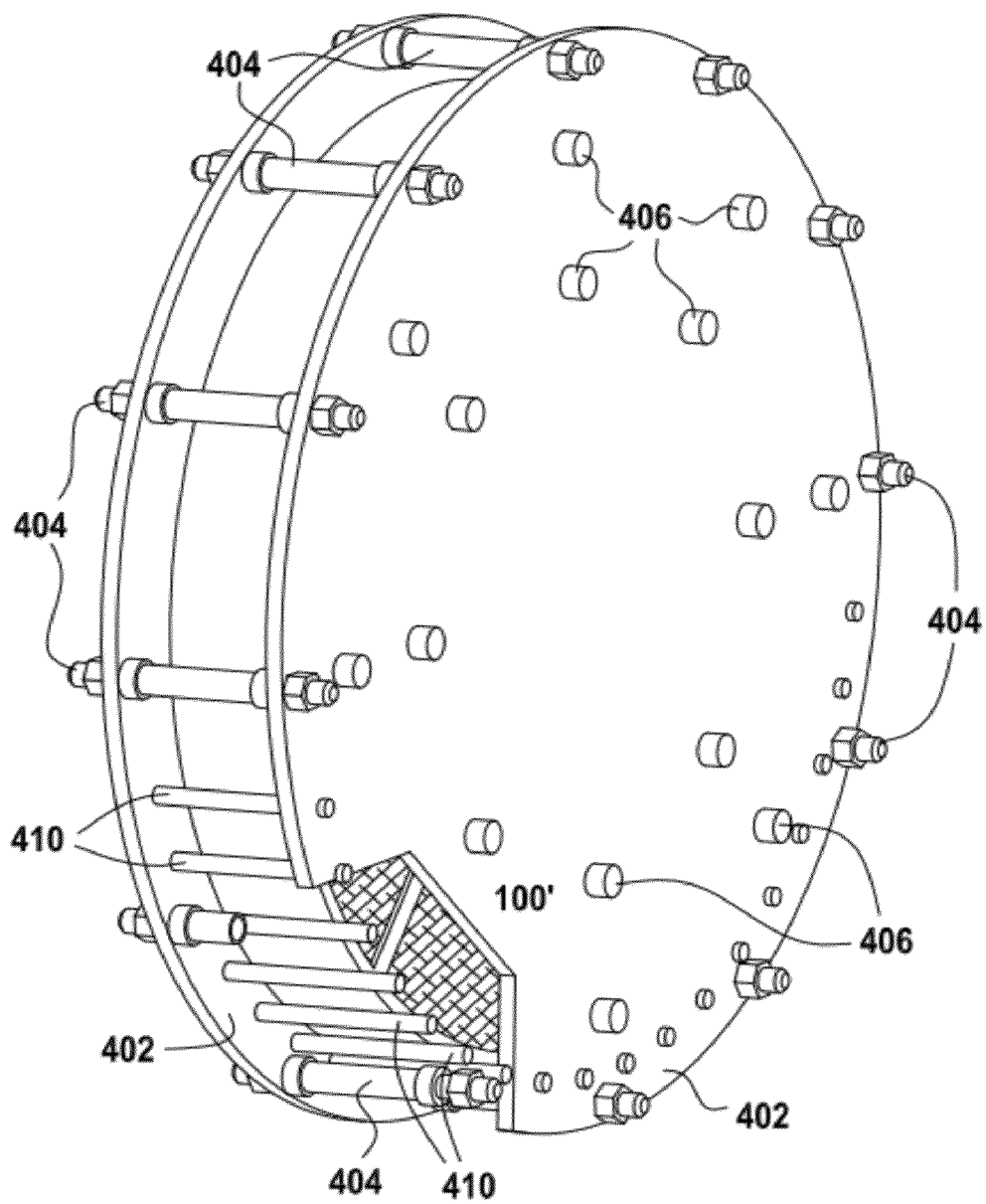
FIG. 5 and 6 are perspective and exploded views corresponding to the subject matter illustrated in FIGS. 4A and 4B.
Figure 6:
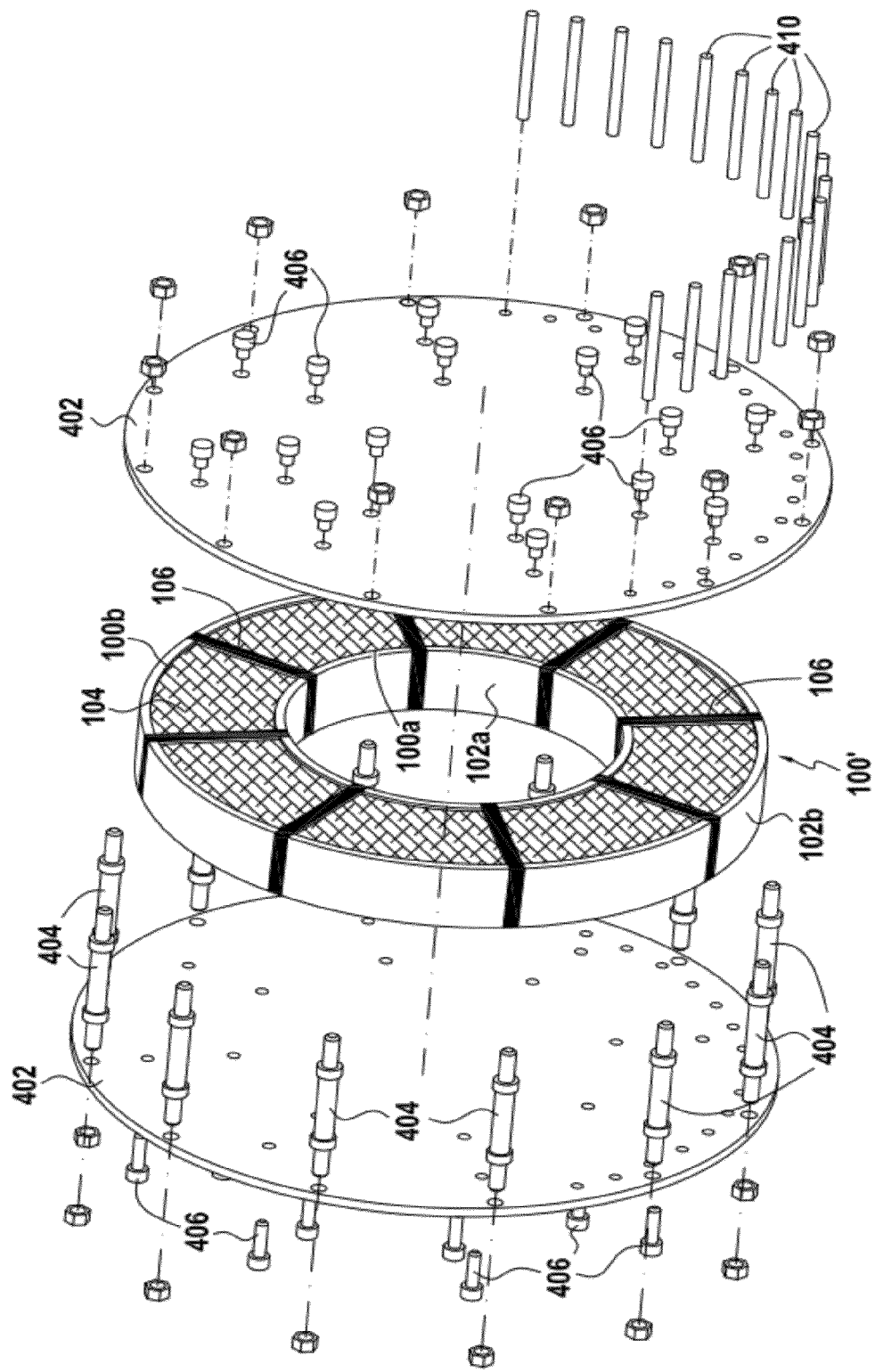

FIGS. 5 and 6 are perspective views and exploded views corresponding to the arrangement illustrated in FIGS. 4A and 4B, and identical elements are identically numbered.

3. CVD-Assisted Film Boiling Process

Another approach to improving the densification obtained by film boiling is to combine the film boiling process with a CVD step at the end of densification. This process is referred to here as thermal gradient chemical vapor deposition ("TG-CVD")

Very high power levels need to be established at the end of a typical film boiling cycle. Densifying a 20" carbon brake disk, for example, may require about 70 W/cm$^2$ (i.e., about 5 to 10 times higher than the initial power level for densifying the core) in order to move the densification front to a position 2 to 10 mm away from the edge/surface. (This may depend on several parameters, such as the preform architecture itself and/or the presence or absence an insulating layer.) As explained hereinabove, this difference in required power levels is a consequence of the strong cooling caused by the turbulent boiling liquid surrounding the preform.

In general, this approach seeks to avoid the cooling effects of the liquid precursor after a pre-determined portion of the preform has been densified with a regular film boiling process.

Figure 7:
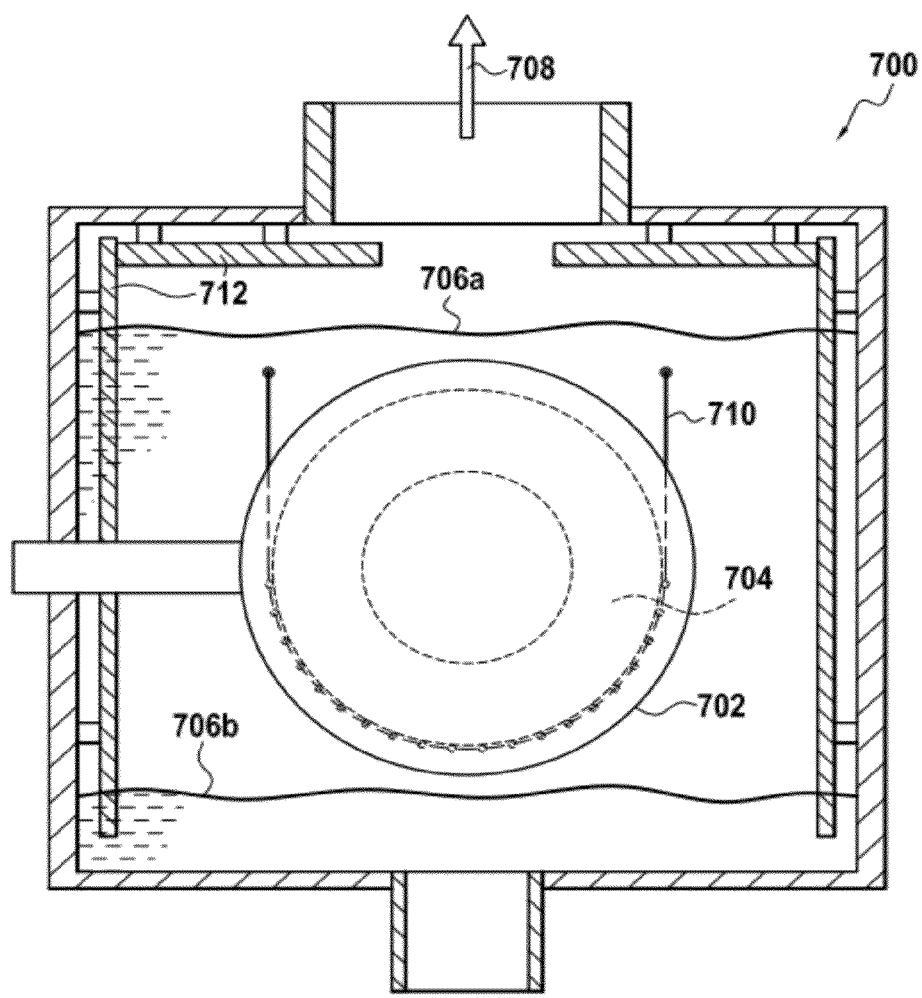
FIG. 7 illustrates another aspect of the present invention.

FIG. 7 illustrates a known film boiling apparatus as generally described in any one or more of U.S. Pat. Nos. 4,472,454, 5,389,152, 5,397,595, 5,733,611, 5,547,717, 5,981,002 and 6,726,962; and PCT patent application No. PCT/EP2007/058193, PCT/EP2007/058195, and/or PCT/EP2007/058197. Reaction chamber 700 has a space therein in which pancake induction coils 702 are provided for inductively heating a preform 704. Overall, the functioning of the film boiling reaction chamber is generally known at least in the aforementioned documents, so a detailed explanation is omitted here, except for the following specific features.

After a pre-determined level of densification has been attained by film boiling, the level 706a of the liquid precursor in the film boiling reactor chamber 700 is lowered to a level 706b so as to expose the preform. (That is, the level of the liquid precursor in the reactor chamber is lowered so that the preform being densified is no longer immersed in the liquid precursor.) However the liquid precursor is not totally drained and a minimum level 706b is maintained in the reactor chamber 700 underneath the part being densified.

This remaining liquid precursor is heated to its boiling point, either by an independent conventional heating system (not shown) for heating liquids (such as a resistive element located at the bottom of reaction chamber 700 (always below level 706b) or by the preform itself when the preform 704 is inductively heated using pancake coils 702. In either case, the liquid precursor is caused to turn into gas phase because of the heat, which gaseous species can infiltrate into the pores of the preform 704 so as to cause a densifying deposit therein.

The cooling effect caused by the liquid precursor is much lower in TG-CVD. Although the densification kinetic is relatively lower (i.e., slower), most of the preform is rapidly densified using film boiling, but the end maximum power to be reached is lower because CVD is used. Edge densification is therefore improved.

Illustrative Example of TG-CVD:

A working example of TG-CVD as contemplated is set forth hereinbelow. Like with all working examples presented herein, the specific features mentioned are only meant to help illustrate the technical approaches described herein, and are not meant to suggest or exclude other equivalent arrangements corresponding to the basic concepts disclosed herein.

A preform 704 is arranged between two generally parallel pancake coils 702. In general, the components in contact with the part being densified must withstand high temperatures (e.g., up to 1200° C). For example and without limitation, an alumina ceramic may be used.

The reactor chamber 700 is filled with a liquid precursor (for example, cyclohexane) until the preform 704 is immersed in the liquid precursor (e.g., to at least level 706a). Thereafter, the preform 704 is heated, such as by electromagnetic direct coupling to a temperature above the cracking temperature of the liquid precursor (for example, between about 900° C. and about 1200° C for cyclohexane).

Densification is started and the power is controlled using, for example, a frequency variation of the electric system (see, for example, commonly owned patent application No. PCT/EP2007/058197, which claims priority from U.S. Provisional Patent Application No. 60/821,596 filed on Aug. 7, 2006) to maintain a constant densification kinetic (although frequency control is not fundamentally part of the present invention). Once the power reaches a pre-determined value, the film boiling process is switched to the TG-CVD process.

The moment at which densification is switched from film boiling to TG-CVD depends on several factors, such as:

1. The maximum available power may be below the power required to complete the densification by film boiling alone.

2. It may be an economical reason, so there will be a compromise between the total cycle time (the longer TG-CVD is used, the longer the overall densification cycle will be), and expenditure of power (the longer the film boiling is used, the more power will be used).

To switch from film boiling to TG-CVD, power to the coils is decreased and water cooling of the pancake coils is increased or initiated in a known manner (such as using water cooling tubes attached to the coil members). The liquid precursor is removed from the reactor chamber to the level 706b so as to expose the preform 704.

In one example according to this approach, the heat from the still-hot preform 704 vaporizes the liquid precursor located thereunder to create a vapor phase of the liquid precursor in the reactor chamber. Then, the power to the pancake coils 702 is tuned according to the frequency variation method, but with a lower set-point to obtain a lower kinetic for finishing the densification process using TG-CVD.

Preferably, fumes 708 from this stage of the process are passed to a condenser (not shown) to as to recycle condensable components in the exhausted vapor.

During the film boiling part of the cycle, the process is relatively easy to manage because of the surrounding boiling liquid. Everything in the reactor chamber is cooled by the evaporating liquid precursor and most of the reactor components do not have to withstand particularly high temperatures.

However, when the liquid precursor is drained to start TG-CVD, some precautions have to be taken:
1. The coil has to be cooled.
2. The exposed part of the reactor must be masked by thermal screens (in a known manner) or be water cooled as the pancake coils are.
3. In general, the exposed parts of the reactor chamber during TG-CVD must withstand temperatures up to about 1200° C.

In FIG. 7, a preform is suspended in a sort of "hammock" or belt 710 made of ceramic or ceramic/metal mix. For example, a plurality of alumina rods may be linked with discontinuous metal wire (such as tungsten or copper wire) to form a sort of supporting belt. This design is useful because it leaves the space underneath the preform free of any support hardware so as to not hinder heating/evaporating of the liquid precursor bath.

To prevent the preform from touching the heating coils (a known problem to be avoided), ceramic pins or the like may be inserted between the preform and the heating coils (for example, protruding between adjacent turns of the heating coils). Vertical ceramic or glass rods could also be used to keep a gap between the preform and the coil. Furthermore, they can be used to facilitate arrangement of the preform in the apparatus, acting as guides when the disk is slid into the hammock from the top. The arrangement of pins 406 illustrated in FIGS. 4A and 4B could be applied here in the manner described in that example.

The reaction chamber 700 must obviously be capable of maintaining a seal and internal pressures appropriate for CVD.

In addition, although not expressly illustrated in FIG. 7, all of the features described and illustrated with reference to FIGS. 1-6 could be used with TG-CVD.

Although the present invention has been described above with reference to certain particular examples for the purpose of illustrating and explaining the invention, it is to be understood that the invention is not limited solely by reference to the specific details of those examples. More specifically, a person skilled in the art will readily appreciate that modifications and developments can be made in the preferred embodiments without departing from the scope of the invention as defined in the accompanying claims.

What is claimed is:
1. A method of densifying a porous substrate comprising:
in a reaction chamber, submerging the porous substrate in a liquid precursor so that the liquid precursor infiltrates pores in the porous substrate;
inductively heating the submerged porous substrate using inductive power to a temperature sufficient to cause the liquid precursor to pyrolize and deposit a decomposition product within the pores of the substrate so as to densify the porous substrate, and
providing a barrier around the porous substrate, the barrier being constructed and arranged to permit some contact between the liquid precursor and the porous substrate,
wherein the barrier comprises a porous mesh material layer disposed on a part of the porous substrate, wherein the porous mesh material has an open porosity of between about 30% and about 60%,
wherein the porosity of the porous mesh material is such that infiltration of the liquid precursor into the pores of the porous substrate is not disrupted and a thermal profile at a beginning of densification is not affected when the inductive power used for densifying the substrate is lower than an inductive power that is required for heating the submerged substrate if the porous mesh material is not used.

2. The method according to claim 1, wherein the porous mesh material is a polytetrafluroethylene ("PTFE") mesh material.

3. The method according to claim 1, comprising covering a peripheral edge of the porous substrate with an insulating material.

4. The method according to claim 3, wherein the porous substrate is an annular member having a radially outward peripheral edge and a radially inward peripheral edge, and covering a peripheral edge of the porous substrate with an insulating material comprising covering the radially outward and radially inward peripheral edges of the annular member with an insulating material.

5. The method according to claim 1, wherein the barrier comprises a wall member located adjacent to the porous substrate.

6. The method according to claim 5, wherein the barrier comprises two substantially parallel wall members located on opposing sides of the porous substrate.

7. The method according to claim 6, wherein a periphery of the two substantially parallel wall members is open to the liquid precursor.

8. The method according to claim 6, wherein a periphery of the two substantially parallel wall members is closed off and at least one of the two substantially parallel wall members has openings formed therethrough.

9. The method according to claim 1, wherein the liquid precursor comprises a hydrocarbon.

10. The method of claim 1, wherein the decomposition product comprises carbon.

11. The method according to claim 9, wherein the hydrocarbon is selected from the group consisting of cyclopentane, cyclohexane, 1-hexene, gasoline, toluene, methylcyclohexane, n-hexane, kerosene, hydrodesulfurized kerosene, benzene, and combinations thereof 12. The method according to claim 1, wherein the liquid precursor contains an organosilane.

13. The method according to claim 12, wherein the organosilane is selected from the group consisting of methyltrichlorosilane, dimethyldichlorosilane, methydichlorosilane, and tris-n-methyl amino silane.

14. The method according to claim 12, wherein the decomposition product comprises silicon carbide and silicon nitride.

15. The method according to claim 1, wherein the liquid precursor is a mixture of an organosilane and a hydrocarbon.

16. The method according to claim 14, wherein the decomposition product is one of carbon/silicon carbide or carbon/silicon nitride.

17. The method according to claim 1, wherein the porous substrate is partially densified by the step of inductively heating the submerged porous substrate, the method further comprising,
after partially densifying the porous substrate, lowering the level of the liquid precursor in the reaction chamber so as to leave the partially densified porous substrate outside of the liquid precursor,
heating the remaining liquid precursor to a temperature at which the remaining liquid precursor vaporizes, and
using the vaporized liquid precursor in a CVD densification process to finish densification of the partially densified porous substrate.

18. The method according to claim 1, wherein the porous mesh material is configured and arranged to improve edges densification of the porous substrate without compromising densification of a core of the porous substrate.

19. The method according to claim 1, wherein the power is equal to or lower than 120kW.

20. A method of densifying a porous substrate comprising:
   in a reaction chamber, submerging the porous substrate in a liquid precursor so that the liquid precursor infiltrates pores in the porous substrate; and
   partially densifying the submerged porous substrate by inductively heating the porous substrate, using inductive power, to a temperature sufficient to cause liquid precursor to pyrolize and deposit a decomposition product within the pores of the substrate,
   arranging a barrier around the porous substrate to permit some contact between the liquid precursor and the porous substrate, the barrier comprises a porous mesh material layer disposed on a part of the porous substrate, wherein the porous mesh material has an open porosity of between about 30% and about 60%, the porosity of the porous mesh material is such that infiltration of the liquid precursor into the pores of the porous substrate is not disrupted and a thermal profile at a beginning of densification is not affected when the inductive power used for densifying the substrate is lower than an inductive power that is required for heating the submerged substrate if the porous mesh material is not used,
   after partially densifying the porous substrate, lowering the level of the liquid precursor in the reaction chamber so as to leave the partially densified porous substrate outside of the liquid precursor,
   heating the remaining liquid precursor to a temperature at which the remaining liquid precursor vaporizes, and
   finishing the densification of the partially densified porous substrate by using the vaporized liquid precursor in a CVD densification process.

* * * * *